United States Patent
Suzuki et al.

(10) Patent No.: US 10,699,677 B2
(45) Date of Patent: Jun. 30, 2020

(54) DISPLAY CONTROLLER TO PREVENT VISUAL ARTIFACTS WITH SPREAD SPECTRUM CLOCKING

(71) Applicant: Intel Corporation, Santa Clara, CA (US)

(72) Inventors: Nobuyuki Suzuki, Portland, OR (US); Robert J. Johnston, Carmichael, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/277,845

(22) Filed: Sep. 27, 2016

(65) Prior Publication Data

US 2018/0090105 A1   Mar. 29, 2018

(51) Int. Cl.
*G09G 5/18* (2006.01)
*H04N 5/04* (2006.01)
*G09G 5/00* (2006.01)

(52) U.S. Cl.
CPC ............ *G09G 5/18* (2013.01); *G09G 5/008* (2013.01); *H04N 5/04* (2013.01); *G09G 2330/06* (2013.01)

(58) Field of Classification Search
CPC .. G09G 5/18; G09G 2310/08; G09G 2330/06; G06T 1/60; H04N 5/04; H04N 1/00933; H04N 1/00994
USPC .......................................................... 345/213
See application file for complete search history.

(56) References Cited

U.S. PATENT DOCUMENTS

| | | | | |
|---|---|---|---|---|
| 5,757,338 A * | 5/1998 | Bassetti | ............... | G09G 3/2096 |
| | | | | 315/85 |
| 5,933,196 A * | 8/1999 | Hatano | ............... | G09G 3/3611 |
| | | | | 348/441 |
| 7,429,963 B2 * | 9/2008 | Chia | ..................... | G06F 3/1423 |
| | | | | 345/213 |
| 2004/0196212 A1 * | 10/2004 | Shimizu | ............... | G06F 3/1431 |
| | | | | 345/3.1 |
| 2016/0203802 A1 * | 7/2016 | Hong | ..................... | G09G 5/006 |
| | | | | 345/534 |

* cited by examiner

*Primary Examiner* — Jennifer Mehmood
*Assistant Examiner* — Ngan T. Pham-Lu
(74) *Attorney, Agent, or Firm* — Womble Bond Dickinson (US) LLP

(57) ABSTRACT

A display controller and method for performing the same operations are described. In on embodiment, the display controller comprises a spread spectrum clock (SSC) modulator having a first input coupled to receive a non-SSC modulated clock and operable to generate a SSC modulated clock in response to the non-SSC modulated clock, a video data transfer portion coupled to receive the SSC modulated clock and operable to output data for display in response to the SSC modulated clock, and a second portion coupled to receive the non-SSC modulated clock.

16 Claims, 6 Drawing Sheets

DISPLAY CONTROLLER TO PREVENT VISUAL ARTIFACTS WITH SPREAD SPECTRUM CLOCKING

FIELD OF THE INVENTION

Embodiments of the present invention relate to the field of display controllers for computing systems; more particularly, embodiments of the present invention relate to display controllers that use spread spectrum clocking to clock a portion of a display controller and another clock to clock other portions of a display controller.

BACKGROUND OF THE INVENTION

A typical computer system uses clock signals to synchronize operations of digital circuitry of the system. Unfortunately, spectral components of these clock signals may contribute to the radiation of electromagnetic interference (EMI) emissions from the system. The EMI emissions may cause undesirable interference with the circuitry of the computer system and other electronic equipment near the computer system. To reduce the EMI emissions outside of the computer system, the circuitry of the computer system may be housed inside a metal casing that prevents the EMI emissions from propagating outside of the casing. However, the casing often adds to the weight and cost of the computer system, and the casing may have a limited EMI shielding capability.

The EMI emissions may be reduced by spread spectrum clocking (SSC), a technique that reduces the energy peaks present in the spectral components of the clock signal. In SSC, a spread spectrum clock signal may be generated by an SSC generator. SSC is widely deployed in the video data transfer interface, such as low-voltage differential signaling (LVDS), Transition-minimized differential signaling (TMDS) and Mobile Industry Processor Interface Display Serial Interface (MIPIDSI), in order to suppress its pixel clock (PCLK) oriented radio frequency (RF) emission and its interference to RF application. SSC usually modulates PCLK cycle. As the PCLK is the unit time of one pixel data transfer, the SSC application moderates the video timing cycle, such as one horizontal (1H) line access cycle as well as one frame update cycle. In a certain display device application, such as, for example, Active Matrix organic light-emitting diode (OLED), the 1H cycle modulation causes each line brightness variation, observed as the visual artifact.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A display controller that prevents or substantially avoids producing visual artifacts is disclosed. The display controller prevents such artifacts by using spread spectrum clocking (SSC) for clocking some of the operations and/or portions of the display controller. More specifically, in one embodiment, the display controller includes two pixel clocks (PCLKs), one is the base clock without SSC modulation and the other has been modulated with SSC modulation. In one embodiment, the SSC modulated PCLK is only applied to portions of the display controller that are involved with the video data transfer, while the non-SSC modulated PCLK is applied to other portions of the display controller. In one embodiment, the other portions include a 1 horizontal (1H) cycle counter, a counter reset, and a vertical synchronization (Vsync) counter. By using the non-SSC modulated clock, 1H cycle and one vertical (1V) frame access cycle are constant and not varied by SSC modulation.

By preventing 1H and 1V cycle from being modulated by SSC, any visual artifact caused by 1H or 1V modulation is suppressed. At the same time, the SSC modulation in PCLK as well as video data, which are the main source of RF emission as well as RF interference, causes suppression of the EMI issues.

In one embodiment, the display controller is part of a computer system.

Figure 1:
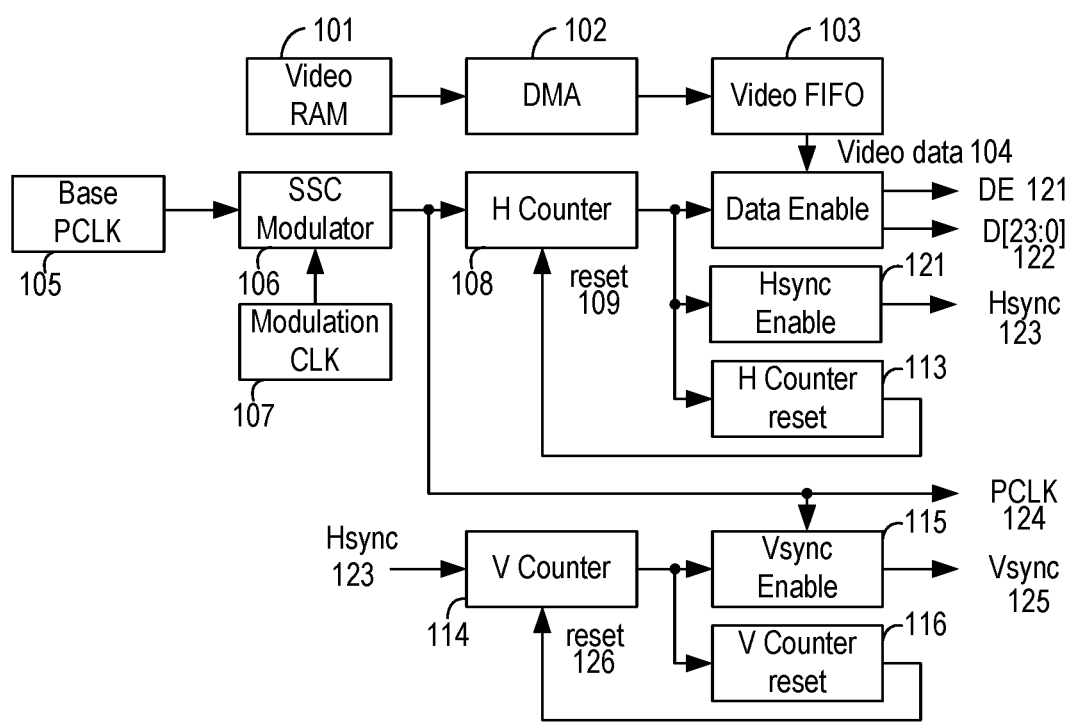
FIG. 1 is a block diagram of a conventional display controller.

To better explain novel features of embodiments of the display controller disclosed herein, the disclosure initially describes a conventional display controller. FIG. 1 shows the conventional display controller design with SSC modulation on PCLK. Referring to FIG. 1, a video memory 101 (e.g., random access memory (RAM)) receives and stores video data. In one embodiment, video memory 101 is part of the display controller. In another embodiment, video memory 101 is not part of the display controller. The video data from video memory 101 is written to video first-in first-out (FIFO) memory 103 via memory transfers, such as, for example, direct memory access (DMA) controller write operations 102. In one embodiment, both FIFO 103 and DMA controller 102 are part of the display controller. The data from video FIFO memory 103 is output as video data 104 to data output enable 110.

A base pixel clock (PCLK) 105 is modulated by SSC modulator 106 based on a reference clock referred to herein as modulation clock (CLK) 107. The SSC modulated PCLK is coupled to an input of H counter 108 as well as a clock input for Vsync signal generator (Vsync enable) 115. In response to the SSC modulated PCLK, H counter 108 counts up and generates a signal to data output enable 110 in a manner well-known in the art to cause data output enable 110 to output a data enable (DE) signal 121 and video data 122 (e.g., D[23:0]) to a display (not shown).

The output signal from H counter 108 is also coupled to an input of Horizontal synchronization (Hsync) signal generator (Hsync Enable) 121, which generates Hsync signal 123 in a manner well known in the art in response to the output signal from H counter 108. H counter reset signal generator 113 also includes an input coupled to receive the output signal from H counter 108 and generates a reset signal 109 that resets H counter 108 in a manner well known in the art.

The display controller also includes V counter 114 that has an input coupled to Hsync signal 123. In response to Hsync signal 123, V counter 114 counts up and generates an output signal in a manner well known in the art. The output signal from V counter 114 is coupled to an input of Vsync enable 115, which generates Vsync signal 125 in a manner well known in the art. The output of V counter 114 is also coupled to an input of V counter reset signal generator 116, which generates a reset signal 126 to reset V counter 114 in a manner well known in the art.

Thus, in FIG. 1, with SSC modulation on PCLK, the H sync cycle and the V sync cycle are modulated together as the SSC modulated PCLK is used for H counter 108 and V counter 114 for the H and V related timing.

Similar to the display controller in FIG. 1, the display controller described herein includes a spread spectrum clock (SSC) modulator having a first input coupled to receive the pixel clock and generates a SSC modulated pixel clock in response to a non-SSC modulated pixel clock. However, in contrast, the display controller described herein includes two portions, one of which is clocked by the SSC modulated pixel clock and the other that is clocked by the non-SSC modulated pixel clock. In one embodiment, the video data transfer portion of the display controller is clocked by and/or is responsive to the SSC modulated pixel clock and outputs data from the display controller for display in response to the SSC modulated pixel clock, while another portion of the display controller receives, is clocked by, and/or is responsive to the non-SSC modulated pixel clock. In one embodiment, this other portion includes a second H counter, an H counter reset signal generator, a Hsync signal generator (Hsync enable), V counter, and V counter reset signal generator.

Figure 2:
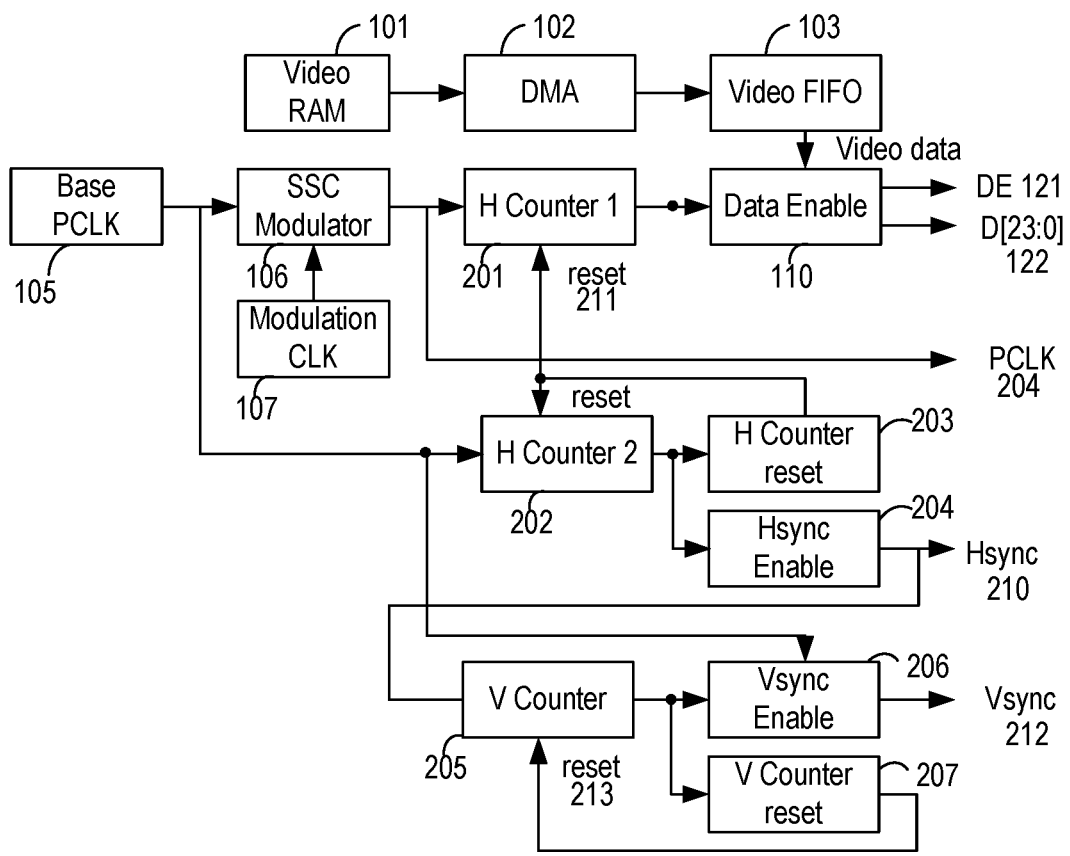
FIG. 2 is a block diagram of one embodiment of a display controller.

FIG. 2 is a block diagram of one embodiment of a display controller. Referring to FIG. 2, as in FIG. 1, a video memory 101 (e.g., random access memory (RAM)) receives and stores video data. The video data from video memory 101 is written to video first-in first-out (FIFO) memory 103 via memory transfers, such as, for example, direct memory access (DMA) write operations 102. The data from video FIFO memory 103 is output as video data 104 to data output enable 110.

A base pixel clock (PCLK) 105 is modulated by SSC modulator 106 based on a reference clock referred to herein as modulation clock (CLK) 107. The SSC modulated PCLK is coupled to an input of a first H counter, H counter 201. In response to the SSC modulated PCLK, H counter 201 counts up and generates a signal to data output enable 110 in a manner well-known in the art to cause data output enable 110 to output a data enable (DE) signal 121 and video data 122 (e.g., D[23:0]) to a display (not shown).

A second H counter, H counter 202, is clocked by base PCLK 105 and counts up in response to base PCLK 105. H counter 202 outputs a signal Hsync signal generator (Hsync enable) 204, which generates Hsync signal 210 in response to the output signal from H counter 202 in a manner well known in the art. In one embodiment, Hsync signal 210 is asserted when H Counter 201 (and H counter 202) is reset, so it follows the non-SSC modulated timing.

H counter reset signal generator 203 also includes an input coupled to receive the output signal from H counter 202 and generates a reset signal 211 that resets both H counter 201 and H counter 202.

The display controller also includes V counter 205 that has an input coupled to Hsync signal 210. In response to Hsync signal 210, V counter 205 counts up and generates an output signal in a manner well known in the art. The output signal from V counter 205 is coupled to an input of Vsync signal generator (Vsync enable) 206. Vsync signal generator 206 is also coupled to receive the non-SSC modulated clock. In response to these inputs, Vsync signal generator 206 generates Vsync signal 212 in a manner well known in the art. Since the Vsync signal 212 is generated by V counter 205, which applies the Hsync signal 210 generated by H Counter 202, it follows the non-SSC modulated PCLK timing.

The output of V counter 205 is also coupled to an input of V counter reset signal generator 207, which generates a reset signal 213 to reset V counter 205.

Thus, the display controller in FIG. 2 includes 2 H counters: H Counter 201 and H Counter 202, where H Counter 201 applies the SSC modulated PCLK as the count-up CLK, and H Counter 202 applies the base PCLK, which is not SSC modulated. The video data transfer is correlated to H Counter 201 so that it follows the SSC modulated PCLK timing. However, H counter 201 is reset by a reset signal that is generated in response to an output of H counter 202, which is correlated to the non-SSC modulated PCLK.

By having the high frequency components of the display controller (e.g., components involved in the video data transfer) and other portions of the display controller (e.g., Hsync generation and at least part of Vsync generation), the display controller provides video data with good visual quality with no or a reduced number of artifacts, thereby avoiding any EMI issues related to the display interface.

Figure 3A:
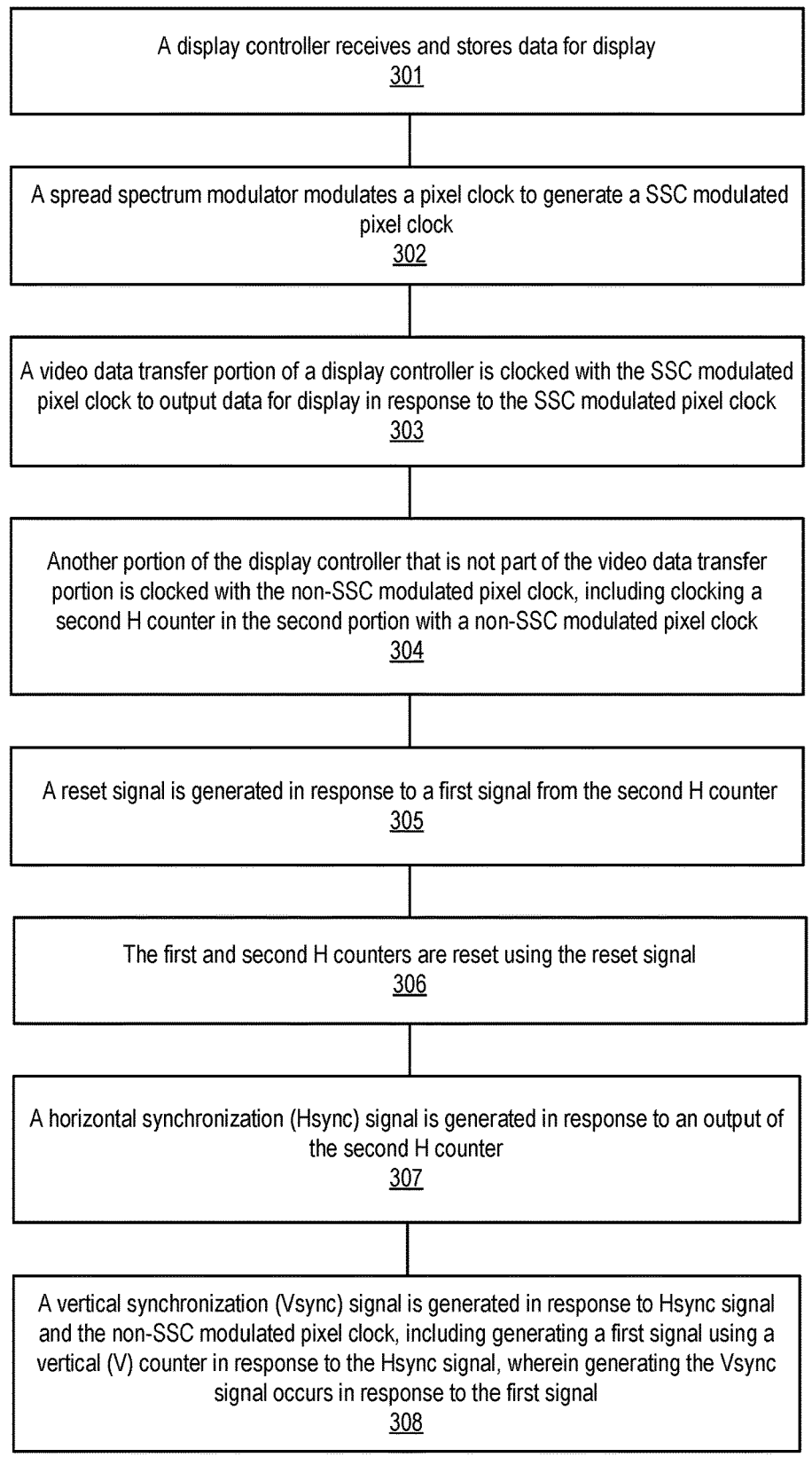
FIG. 3A is a flow diagram of one embodiment of a process for generating display data.

FIG. 3A is a flow diagram of one embodiment of a process for generating display data. In one embodiment, the process is performed by processing logic that may comprise hardware (circuitry, dedicated logic, etc.), software (such as is run on a general purpose computer system or a dedicated machine), firmware, or a combination of the three.

Referring to FIG. 3A, the process begins by processing logic in the display controller receiving and storing data for display (processing block 301).

Also, a spread spectrum modulator modulates a pixel clock to generate a SSC modulated pixel clock (processing block 302). A video data transfer portion of a display controller is clocked with the SSC modulated pixel clock to output data for display in response to the SSC modulated pixel clock (processing block 303).

Another portion of the display controller that is not part of the video data transfer portion is clocked with the non-SSC modulated pixel clock, including clocking a second H counter in the second portion with a non-SSC modulated pixel clock (processing block 304).

Furthermore, a reset signal is generated in response to a first signal from the second H counter (processing block 305) and the first and second H counters are reset using the reset signal (processing block 306).

Moreover, a horizontal synchronization (Hsync) signal is generated in response to an output of the second H counter (processing block 307)

A vertical synchronization (Vsync) signal is generated in response to Hsync signal and the non-SSC modulated pixel clock, including generating a first signal using a vertical (V) counter in response to the Hsync signal, wherein generating the Vsync signal occurs in response to the first signal (processing block 308).

Figure 3B:
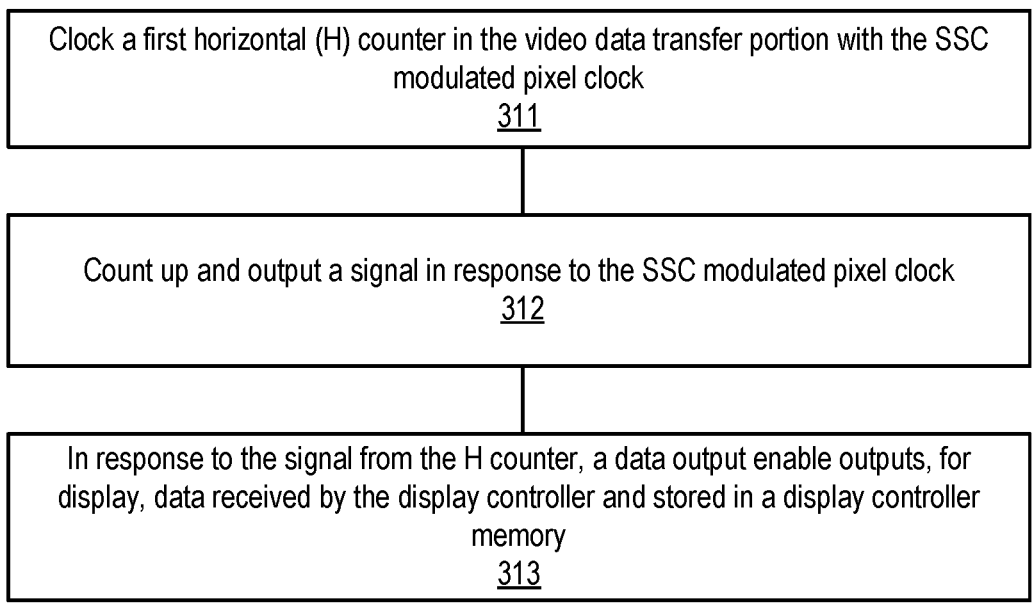
FIG. 3B is a flow diagram of one embodiment of the processor for generating display data using a video transfer portion clocked with a SSC modulated pixel clock

FIG. 3B is a flow diagram of one embodiment of the processor for generating display data using a video transfer portion clocked with a SSC modulated pixel clock. In one embodiment, the process is performed by processing logic that may comprise hardware (circuitry, dedicated logic, etc.), software (such as is run on a general purpose computer system or a dedicated machine), firmware, or a combination of the three.

Referring to FIG. 3B, the process includes clocking a first horizontal (H) counter in the video data transfer portion with the SSC modulated pixel clock (processing block 311). Next, the horizontal (H) counter counts up and outputs a signal in response to the SSC modulated pixel clock (processing block 312). In response to the signal from the H counter, a data output enable outputs, for display, data received by the display controller and stored in a display controller memory (e.g., FIFO) (processing block 313).

Figure 4:
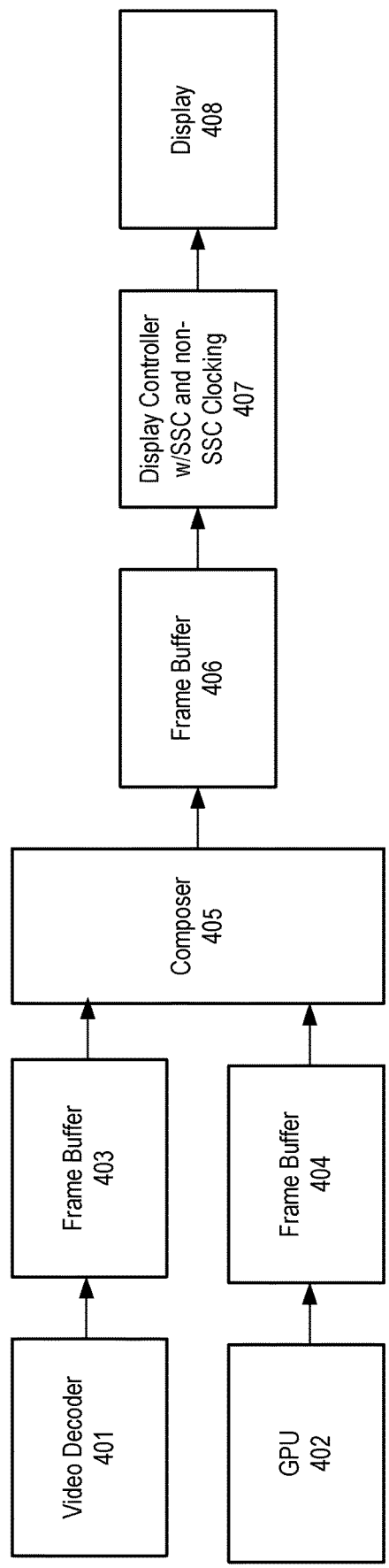
FIG. 4 is a block diagram of one embodiment of example data sources for video data being processed by a display controller.

FIG. 4 is a block diagram of one embodiment of example data sources for video data being processed by a display controller. Referring to FIG. 4, data for display are generated by a video decoder 401 (e.g., video codec) and graphics processing unit 402, and stored in frame buffers 403 and 404, respectively, which are part of main memory. The stored A composer 405 combines the data from frame buffers 403 and 404 to generate a composited output frame that is stored in frame buffer 406, which is part of main memory. The stored composited output frame is read from frame buffer 406 by display controller 407. Display controller 407 clocks portions with a SSC modulated clock and other portions with a non-SSC modulated clock. Display controller 407 sends the composited output frame to a display 408 for display.

Figure 5:
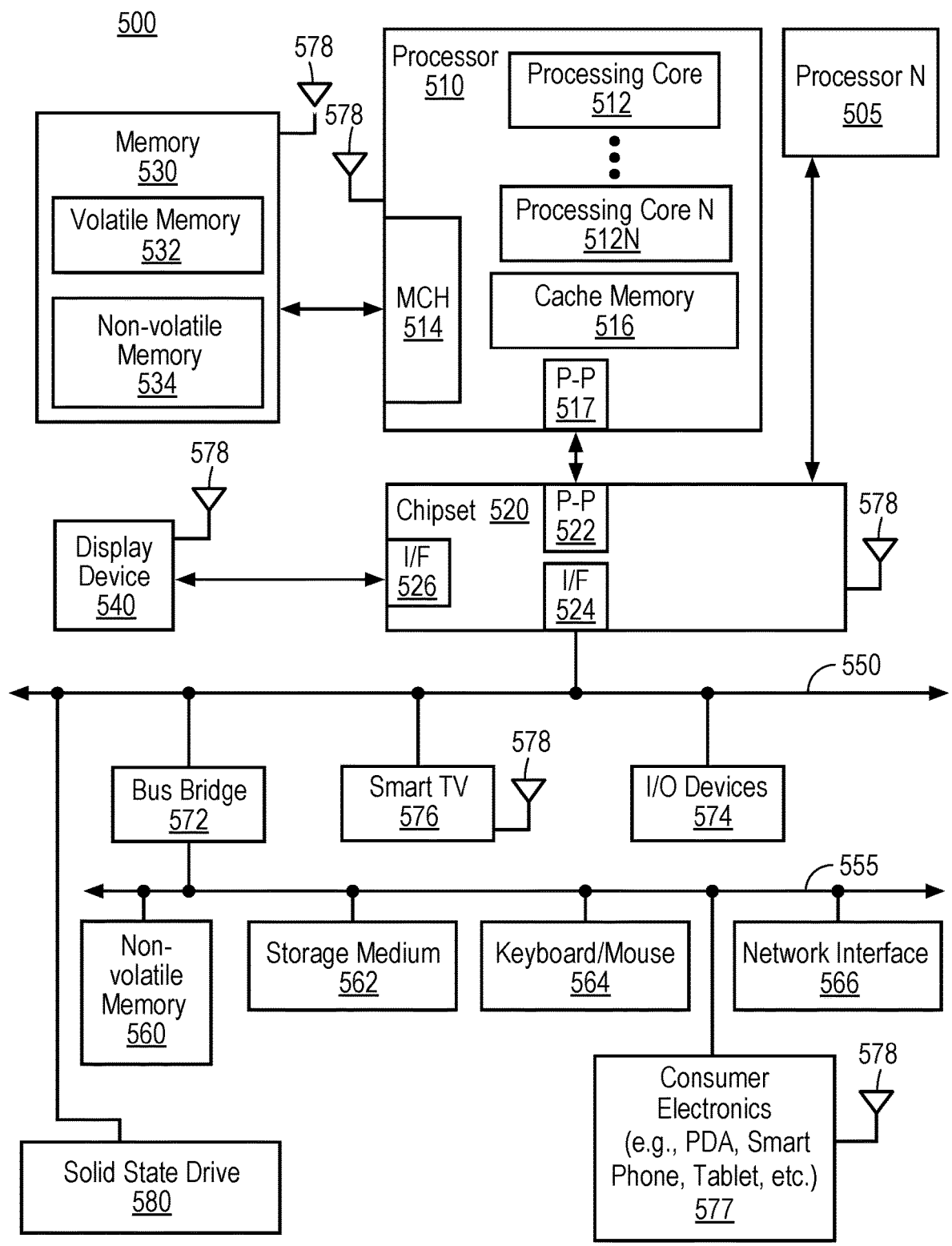
FIG. 5 is a block diagram of one embodiment of a computer system.

FIG. 5 is one embodiment of a system level diagram 500 that may incorporate the techniques described above. For example, the techniques described above may be used in conjunction with a processor in system 500 or other part of system 500.

Referring to FIG. 5, system 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 500 implements the methods disclosed herein and may be a system on a chip (SOC) system.

In one embodiment, processor 510 has one or more processor cores 512 to 512N, where 512N represents the Nth processor core inside the processor 510 where N is a positive integer. In one embodiment, system 500 includes multiple processors including processors 510 and 505, where processor 505 has logic similar or identical to logic of processor 510. In one embodiment, system 500 includes multiple processors including processors 510 and 505 such that processor 505 has logic that is completely independent from the logic of processor 510. In such an embodiment, a multi-package system 500 is a heterogeneous multi-package system because the processors 505 and 510 have different logic units. In one embodiment, processing core 512 includes, but is not limited to, pre-fetch logic to fetch instructions, decode logic to decode the instructions, execution logic to execute instructions and the like. In one embodiment, processor 510 has a cache memory 516 to cache instructions and/or data of the system 500. In another embodiment of the invention, cache memory 516 includes level one, level two and level three, cache memory, or any other configuration of the cache memory within processor 510.

In one embodiment, processor 510 includes a memory control hub (MCH) 514, which is operable to perform functions that enable processor 510 to access and communicate with a memory 530 that includes a volatile memory 532 and/or a non-volatile memory 534. In one embodiment, memory control hub (MCH) 514 is positioned outside of processor 510 as an independent integrated circuit.

In one embodiment, processor 510 is operable to communicate with memory 530 and a chipset 520. In such an embodiment, SSD 580 executes the computer-executable instructions when SSD 580 is powered up.

In one embodiment, processor 510 is also coupled to a wireless antenna 578 to communicate with any device configured to transmit and/or receive wireless signals. In one embodiment, wireless antenna interface 578 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory (e.g., NAND, NOR), phase change memory (PCM), read-only memory (ROM), electrically erasable programmable read-only memory (EEPROM), or any other type of non-volatile memory device.

Memory 530 stores information and instructions to be executed by processor 510. In one embodiment, chipset 520 connects with processor 510 via Point-to-Point (PtP or P-P) interfaces 517 and 522. In one embodiment, chipset 520 enables processor 510 to connect to other modules in the system 500. In one embodiment, interfaces 517 and 522 operate in accordance with a PtP communication protocol such as the Intel QuickPath Interconnect (QPI) or the like.

In one embodiment, chip set 520 is operable to communicate with processor 510, 505, display device 540, and other devices 572, 576, 574, 560, 562, 564, 566, 577, etc. In one embodiment, chipset 520 is also coupled to a wireless antenna 578 to communicate with any device configured to transmit and/or receive wireless signals.

In one embodiment, chip set 520 connects to a display device 540 via an interface 526. In one embodiment, display device 540 includes, but is not limited to, liquid crystal display (LCD), plasma, cathode ray tube (CRT) display, or any other form of visual display device. In addition, chipset 520 connects to one or more buses 550 and 555 that interconnect various modules 574, 560, 562, 564, and 566. In one embodiment, buses 550 and 555 may be interconnected together via a bus bridge 572 if there is a mismatch in bus speed or communication protocol. In one embodiment, chipset 520 couples with, but is not limited to, a non-volatile memory 560, a mass storage device(s) 562, a keyboard/mouse 564, and a network interface 566 via interface 524, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 5 are depicted as separate blocks within the system 500, the functions performed by some of these blocks may be integrated within a single semiconductor circuit or may be implemented using two or more separate integrated circuits.

In a first example embodiment, a display controller comprises a spread spectrum clock (SSC) modulator having a first input coupled to receive a non-SSC modulated clock and operable to generate a SSC modulated clock in response to the non-SSC modulated clock, a video data transfer portion coupled to receive the SSC modulated clock and operable to output data for display in response to the SSC modulated clock, and a second portion coupled to receive the non-SSC modulated clock.

In another example embodiment, the subject matter of the first example embodiment can optionally include first and second horizontal (H) counters, the first H counter coupled to receive the SSC modulated clock and being in the video data transfer portion and the second H counter coupled to receive the non-SSC modulated clock and being in the second portion. In another example embodiment, the subject matter of this example embodiment can optionally include an H counter reset generator coupled to the first and second H counters and responsive to an output of the second H counter to generate a reset signal to reset the first and second H counters. In another example embodiment, the subject matter of that example embodiment can optionally include a horizontal synchronization (Hsync) signal generator coupled to an output of the second H counter and operable to generate a Hsync signal in response to the output of the second H counter. In another example embodiment, the subject matter of this example embodiment can optionally include that a vertical synchronization (Vsync) signal generator operable to generate a Vsync signal in response to Hsync signal and the non-SSC modulated clock. In another example embodiment, the subject matter of this example embodiment can optionally include a vertical (V) counter coupled to receive the Hsync signal and operable to output a first signal in response to the Hsync signal, where the Vsync signal generator has a second input coupled to receive the first signal and operable to generate the Vsync signal in response to the first signal.

In another example embodiment, the subject matter of the first example embodiment can optionally include that the video data transfer portion comprises a memory coupled to receive data for display, a horizontal (H) counter coupled to receive the SSC modulated clock and operable to output a second signal in response to the SSC modulated clock, and a data output enable coupled to receive the count signal and the memory and operable to output, for display, data from the memory in response to the second signal.

In a second example embodiment, a system comprises a display; a processor operable to generate data for the display; and a display controller coupled to the processor and the display, where the display controller comprises a spread spectrum clock (SSC) modulator having a first input coupled to receive a non-SSC modulated clock and operable to generate a SSC modulated clock in response to the non-SSC modulated clock, a video data transfer portion coupled to receive the SSC modulated clock and operable to output data for display in response to the SSC modulated clock, and a second portion coupled to receive the non-SSC modulated clock.

In another example embodiment, the subject matter of the second example embodiment can optionally include first and second horizontal (H) counters, the first H counter coupled to receive the SSC modulated clock and being in the video data transfer portion and the second H counter coupled to receive the non-SSC modulated clock and being in the second portion. In another example embodiment, the subject matter of this example embodiment can optionally include an H counter reset generator coupled to the first and second H counters and responsive to an output of the second H counter to generate a reset signal to reset the first and second H counters. In another example embodiment, the subject matter of that example embodiment can optionally include a horizontal synchronization (Hsync) signal generator coupled to an output of the second H counter and operable to generate a Hsync signal in response to the output of the second H counter. In another example embodiment, the subject matter of the second example embodiment can optionally include a vertical synchronization (Vsync) signal generator operable to generate a Vsync signal in response to Hsync signal and the non-SSC modulated clock. In another example embodiment, the subject matter of this example embodiment can optionally include that a vertical (V) counter coupled to receive the Hsync signal and operable to output a first signal in response to the Hsync signal, where the Vsync signal generator has a second input coupled to receive the first signal and operable to generate the Vsync signal in response to the first signal. In another example embodiment, the subject matter of this example embodiment can optionally include that the video data transfer portion comprises a memory coupled to receive data for display, a horizontal (H) counter coupled to receive the SSC modulated clock and operable to output a second signal in response to the SSC modulated clock, and a data output enable coupled to the display and the memory and to receive the second signal, the data output enable being operable to output, for display on the display, data from the memory in response to the second signal.

In another example embodiment, the subject matter of the second example embodiment can optionally include that the processor comprises a video decoder and a graphics processing unit to generate the data for the display.

In a third example embodiment, a method comprises modulating a clock with a spread spectrum clock (SSC) modulator to generate a SSC modulated clock, clocking a video data transfer portion of a display controller with the SSC modulated clock to output data for display in response to the SSC modulated clock, and clocking a second portion of the display controller with the non-SSC modulated clock.

In another example embodiment, the subject matter of the third example embodiment can optionally include clocking a first horizontal (H) counter in the video data transfer portion with the SSC modulated clock and clocking a second H counter in the second portion with a non-SSC modulated clock. In another example embodiment, the subject matter of this example embodiment can optionally include generating a reset signal in response to a first signal from the second H counter and resetting the first and second H counters using the reset signal. In another example embodiment, the subject matter of that example embodiment can optionally include generating a horizontal synchronization (Hsync) signal in response to an output of the second H counter. In another example embodiment, the subject matter of this example embodiment can optionally include generating a vertical synchronization (Vsync) signal in response to Hsync signal and the non-SSC modulated clock. In another example embodiment, the subject matter of this example embodiment can optionally include generating a first signal using a vertical (V) counter in response to the Hsync signal, wherein generating the Vsync signal occurs in response to the first signal.

In another example embodiment, the subject matter of the second example embodiment can optionally include storing in a memory data for display received by the display controller, outputting a first signal in response to the SSC modulated clock using a horizontal (H) counter, and outputting, for display and in response to the first signal, data received from the memory.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A display controller comprising:
a base pixel clock;
a spread spectrum clock (SSC) modulator having a first input coupled to receive a non-SSC modulated clock from the base pixel clock and operable to generate a SSC modulated clock in response to the non-SSC modulated clock;
a video data transfer portion comprising a first horizontal (H) counter coupled to receive the SSC modulated clock and count up for generation of a video data output signal in response to the SSC modulated clock, and the video data transfer portion operable to output data from the display controller for display in response to the video data output signal of the first H counter; and
a second portion comprising a second H counter coupled to receive the non-SSC modulated clock from the base pixed clock and count up for generation of a horizontal synchronization (Hsync) signal, and the second portion operable to control a horizontal line access cycle and a vertical frame access cycle using the non-SSC modulated clock of the second H counter, wherein the second portion further comprises an H counter reset generator coupled to the first and second H counters and responsive to an output of the second H counter to generate a reset signal to reset the first and second H counters.

2. The display controller defined in claim 1 further comprising a horizontal synchronization (Hsync) signal generator coupled to an output of the second H counter and operable to generate the Hsync signal in response to the output of the second H counter.

3. The display controller defined in claim 2 further comprising a vertical synchronization (Vsync) signal generator operable to generate a Vsync signal in response to the Hsync signal based on the second H counter.

4. The display controller defined in claim 3 further comprising a vertical (V) counter coupled to receive the Hsync signal and operable to output a first signal in response to the Hsync signal, the Vsync signal generator having a second input coupled to receive the first signal and operable to generate the Vsync signal in response to the first signal.

5. The display controller defined in claim 1 wherein the video data transfer portion comprises:
a memory coupled to receive data for display;
a data output enable coupled to receive the count signal and the memory and operable to output, for display, data from the memory in response to the second signal.

6. A system comprising:
a display;
a processor operable to generate data for the display; and
a display controller coupled to the processor and the display, the display controller comprising;
   a base pixel clock;
   a spread spectrum clock (SSC) modulator having a first input coupled to receive a non-SSC modulated clock from the base pixel clock and operable to generate a SSC modulated clock in response to the non-SSC modulated clock,
   a video data transfer portion comprising a first horizontal (H) counter coupled to receive the SSC modulated clock and count up for generation of a video data output signal in response to the SSC modulated clock, and the video data transfer portion operable to output data from the display controller for display in response to the video data output signal of the first H counter, and
   a second portion comprising a second H counter coupled to receive the non-SSC modulated clock from the base pixel clock and count up for generation of a horizontal synchronization (Hsync) signal, and the second portion operable to control a horizontal line access cycle and a vertical frame access cycle using the non-SSC modulated clock of the second H counter, wherein the second portion further comprises an H counter reset generator coupled to the first and second H counters and responsive to an output of the second H counter to generate a reset signal to reset the first and second H counters.

7. The system defined in claim 6 further comprising a horizontal synchronization (Hsync) signal generator coupled to an output of the second H counter and operable to generate the Hsync signal in response to the output of the second H counter.

8. The system defined in claim 7 further comprising a vertical synchronization (Vsync) signal generator operable to generate a Vsync signal in response to the Hsync signal based on the second H counter.

9. The system defined in claim 8 further comprising a vertical (V) counter coupled to receive the Hsync signal and operable to output a first signal in response to the Hsync signal, the Vsync signal generator having a second input coupled to receive the first signal and operable to generate the Vsync signal in response to the first signal.

10. The system defined in claim 9 wherein the video data transfer portion comprises:
   a memory coupled to receive data for display; and
   a data output enable coupled to the display and the memory and to receive the second signal, the data output enable being operable to output, for display on the display, data from the memory in response to the second signal.

11. The system defined in claim 6 wherein the processor comprises a video decoder and a graphics processing unit to generate the data for the display.

12. A method comprising:
   modulating a clock with a spread spectrum clock (SSC) modulator to generate a SSC modulated clock, the spread spectrum clock (SSC) modulator having a first input coupled to receive a non-SSC modulated clock from a base pixel clock and operable to generate the SSC modulated clock in response to the non-SSC modulated clock;
   clocking a video data transfer portion of a display controller with the SSC modulated clock, the video data transfer portion comprising a first horizontal (H) counter to receive the SSC modulated clock and count up for generation of a video data output signal in response to the SSC modulated clock, wherein the video data transfer portion to output data from the display controller for display in response to the video data output signal of the first H counter; and
   clocking a second portion of the display controller with the non-SSC modulated clock, the second portion of the display controller comprising a second H counter to receive the non-SSC modulated clock from the base pixel clock and count up for generation of a horizontal synchronization (Hsync) signal, wherein the second portion to control a horizontal line access cycle and a vertical frame access cycle using the non-SSC modulated clock of the second H counter, wherein the second portion further comprises an H counter reset generator coupled to the first and second H counters and, in response to an output of the second H counter, the H counter reset generator generating a reset signal to reset the first and second H counter.

13. The method defined in claim 12 further comprising generating a horizontal synchronization (Hsync) signal in response to an output of the second H counter.

14. The method defined in claim 13 further comprising generating a vertical synchronization (Vsync) signal in response to the Hsync signal based on the second H counter.

15. The method defined in claim 14 further comprising generating a first signal using a vertical (V) counter in response to the Hsync signal, wherein generating the Vsync signal occurs in response to the first signal.

16. The method defined in claim 12 further comprising:
   storing in a memory data for display received by the display controller; and
   outputting, for display and in response to the first signal, data received from the memory.

* * * * *